US010146553B2

(12) United States Patent
Lee et al.

(10) Patent No.: US 10,146,553 B2
(45) Date of Patent: Dec. 4, 2018

(54) ELECTRONIC APPARATUS AND BOOTING METHOD THEREOF

(71) Applicant: SAMSUNG ELECTRONICS CO., LTD., Suwon-si, Gyeonggi-do (KR)

(72) Inventors: Hak-bong Lee, Suwon-si (KR); Jae-wook Kwon, Yongin-si (KR); Nam-jae Jeon, Seoul (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 99 days.

(21) Appl. No.: 15/280,050

(22) Filed: Sep. 29, 2016

(65) Prior Publication Data
US 2017/0090947 A1 Mar. 30, 2017

(30) Foreign Application Priority Data

Sep. 30, 2015 (KR) ........................ 10-2015-0137423

(51) Int. Cl.
G06F 9/44 (2018.01)
G06F 9/4401 (2018.01)

(52) U.S. Cl.
CPC .......... *G06F 9/4408* (2013.01); *G06F 9/4401* (2013.01)

(58) Field of Classification Search
CPC .... G06F 9/44502; G06F 9/44508; G06F 1/24; G06F 9/44526; G06F 15/177; G06F 9/44514; G06F 9/44523; G06F 11/1417; G06F 9/44505
See application file for complete search history.

(56) References Cited

U.S. PATENT DOCUMENTS

| 8,745,363 | B2 | 6/2014 | Sohn et al. |
| 2006/0155941 | A1* | 7/2006 | Yamaguchi ............... G06F 8/60 711/154 |
| 2008/0082808 | A1 | 4/2008 | Rothman et al. |
| 2008/0215800 | A1 | 9/2008 | Lee et al. |
| 2009/0300269 | A1 | 12/2009 | Radke et al. |
| 2011/0161647 | A1 | 6/2011 | Sohn et al. |
| 2011/0252288 | A1 | 10/2011 | Sharon et al. |
| 2011/0283051 | A1 | 11/2011 | Lieber et al. |

(Continued)

FOREIGN PATENT DOCUMENTS

| JP | 2011-522350 | 7/2011 |
| KR | 10-2008-0029947 | 4/2008 |

(Continued)

OTHER PUBLICATIONS

Search Report and Written Opinion dated Jan. 5, 2017 in counterpart International Patent Application No. PCT/KR2016/010937.

*Primary Examiner* — Zahid Choudhury
(74) *Attorney, Agent, or Firm* — Nixon & Vanderhye, P.C.

(57) ABSTRACT

An electronic apparatus is provided. The electronic apparatus includes a storage divided into a first area and a second area, the second area having a storage method different than a storage method of the first area regarding data from the first area and a processor configured to, in response to a predetermined event occurring, store booting data stored in the first area in the second area, and if the predetermined event occurs again while the booting data is stored in the second area, to boot the electronic apparatus using the booting data stored in the second area.

12 Claims, 9 Drawing Sheets

(56) References Cited

U.S. PATENT DOCUMENTS

| | | |
|---|---|---|
| 2013/0262848 A1 | 10/2013 | Chan et al. |
| 2014/0215199 A1 | 7/2014 | Ma et al. |
| 2015/0039876 A1 | 2/2015 | Baratam et al. |
| 2015/0067242 A1* | 3/2015 | Kuroki .................. G06F 9/4406 711/103 |
| 2015/0106548 A1 | 4/2015 | Dubois et al. |

FOREIGN PATENT DOCUMENTS

| | | |
|---|---|---|
| KR | 10-2011-0006352 | 1/2011 |
| KR | 10-2011-0078171 | 7/2011 |

\* cited by examiner

| BLOCK NO. | BLOCK ADDRESS IN FIRST AREA | BLOCK ADDRESS SECOND AREA |
|---|---|---|
| 1 | x10 | y1 |
| 2 | x17 | y2 |
| 3 | x30 | y3 |
| 4 | x34 | y4 |
| 5 | x40 | y5 |
| 6 | x48 | y6 |

ELECTRONIC APPARATUS AND BOOTING METHOD THEREOF

CROSS-REFERENCE TO RELATED APPLICATIONS

This application is based on and claims priority under 35 U.S.C. § 119 to Korean Patent Application No. 10-2015-0137423, filed in the Korean Intellectual Property Office on Sep. 30, 2015, the disclosure of which is incorporated by reference herein in its entirety.

BACKGROUND

1. Field

Aspects of the example embodiments relate generally to an electronic apparatus and a booting method thereof, and for example, to an electronic apparatus which performs booting using booting data stored in a disk and a booting method thereof.

2. Description of Related Art

With the development of electronic technology, various types of display apparatuses have been developed. In particular, electronic apparatuses such as TV, PC, laptop computer, tablet PC, mobile phone, MP3 player, etc. are being used in almost every households, showing a high penetration rate.

Recently, in order to satisfy users' needs for more up-to-date and diverse functions, efforts have been made to develop electronic apparatuses in more advanced forms.

Meanwhile, such electronic apparatuses perform booting by loading data which is stored in a disk and used for the booting onto a memory in order to make the electronic apparatuses available prior to executing various applications.

However, the time required for the booting causes inconvenience for users who expect prompt execution of the electronic apparatuses.

Accordingly, a method to improve user convenience by minimizing and/or reducing the booting time of the electronic apparatuses is required.

SUMMARY

An aspect of the example embodiment relates to an electronic apparatus which has an improved booting speed and a booting method thereof.

According to an example embodiment, an electronic apparatus is provided, the electronic apparatus including a storage divided into a first area and a second area having a storage method different from the first area regarding data from the first area and a processor configured to store booting data stored in the first area in the second area, in response to a predetermined event occurring, and if the predetermined event occurs again while the booting data is stored in the second area, to boot the electronic apparatus using the booting data stored in the second area.

The first area may have a higher number of bits stored per cell than the second area.

The first area may be provided in a Multi Level Cell (MLC) type and the second area is provided in a Single Level Cell (SLC) type.

The processor, in response to the predetermined event occurring, may store booting data stored randomly in a plurality of blocks constituting the first area in a plurality of blocks constituting the second area sequentially.

The processor may generate metadata for mapping each of a plurality of blocks where the booting data is stored in the first area with each of a plurality of blocks where the booting data is stored in the second area and in response to the predetermined event occurring again, boot the electronic apparatus using the booting data stored in the second area using the metadata.

The second area may have a minimum and/or reduced storage area for storing the booting data stored in the first area.

The processor may operate the electronic apparatus using data stored in the first area after booting of the electronic apparatus is completed based on the booting data stored in the second area.

The predetermined event may be a turn-on operation of the electronic apparatus.

According to an example embodiment, a booting method of an electronic apparatus is provided, the electronic apparatus including a storage which is divided into a first area and a second area having a storage method different from the first area regarding data from the first area including, in response to a predetermined event occurring, storing booting data stored in the first area in the second area and in response to the predetermined event occurring again while the booting data is stored in the second area, booting the electronic apparatus using the booting data stored in the second area.

The first area may have a higher number of bits stored per cell than the second area.

The first area may be provided in a Multi Level Cell (MLC) type and the second area may be provided in a Single Level Cell (SLC) type.

The method may further include, in response to the predetermined event occurring, storing booting data stored randomly in a plurality of blocks constituting the first area in a plurality of blocks constituting the second area sequentially.

The method may further include generating metadata for mapping each of a plurality of blocks where the booting data is stored in the first area with each of a plurality of blocks where the booting data is stored in the second area and in response to the predetermined event occurring once again, booting the electronic apparatus using the booting data stored in the second area using the metadata.

The second area may have a minimum and/or reduced storage area for storing the booting data stored in the first area.

The method may further include operating the electronic apparatus using data stored in the first area after booting of the electronic apparatus is completed based on the booting data stored in the second area.

The predetermined event may be a turn-on operation of the electronic apparatus.

As described above, according to various example embodiments, the booting speed of an electronic apparatus can be enhanced, thereby further improving user convenience.

BRIEF DESCRIPTION OF THE DRAWINGS

The above and/or other aspects of the disclosure will be more apparent from the following detailed description, taken in conjunction with the accompanying drawings, in which like reference numerals refer to like elements, and wherein.

DETAILED DESCRIPTION

Hereinafter, the present disclosure will be described in greater detail with reference to the accompanying drawings.

Figure 1:
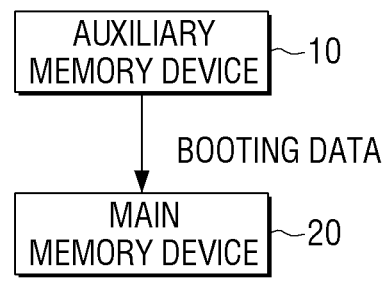
FIG. 1 is a diagram illustrating an example booting of an electronic apparatus according to an example embodiment.

FIG. 1 is a diagram illustrating example booting of an electronic apparatus (not shown) according to an example embodiment.

The booting may refer, for example, to an operation of starting or restarting an electronic apparatus (not shown), and as illustrated in FIG. 1, the booting includes the process of loading booting data stored in an auxiliary memory device (e.g., a memory) 10 onto a main memory device (e.g., a memory) 20.

Here, the booting data may be system software. The examples of the system software include operating system of computer, compiler, utility, etc.

The auxiliary memory device 10 may refer, for example, to a device for memorizing large-scale data which can be memorized in a main memory device. For example, the auxiliary memory device 10 may include a hard disk, a flash disk, etc. Specifically, the auxiliary memory device 10 may store a boot loader which drives a system, an operating system, an application, a user content, etc.

The main memory device 20 may refer, for example, to a device for storing a program which is currently executed and data which is required for the program temporarily. The program files stored in the auxiliary memory device 10 may be used by a CPU only when they are loaded onto the main memory device 20. In the example embodiment, the main memory device 20 mainly refers, for example, to a RAM, but is not limited thereto. The RAM may be divided into a dynamic random access memory (DRAM) and a static random access memory (SRAM).

For example, taking a Linux kernel which is an operating system as an example, the Linux kernel stored in the auxiliary memory device 10 is loaded onto the main memory device 20 by a boot loader which initiates a device and set the device to be operable. Subsequently, the Linux kernel loads a specific program file stored in the auxiliary memory device 10 onto the main memory device 20 using memory management provided with the kernel in order to execute the specific program. One of the methods used herein is a page fault. The page fault is a method of dividing data stored in the auxiliary memory device 10 by page unit (for example, 4 KB) and loading each data required to operate a program onto the main memory device 20 by page unit.

Meanwhile, the electronic apparatus may be implemented as personal computer (PC), laptop computer, mobile phone, smart phone, tablet PC, personal digital assistant (PDA), enterprise digital assistant (EDA), digital still camera, digital video camera, audio device, portable multimedia player (PMP), personal navigation device or portable navigation device (PND), MP3 player, handheld game console, or e-book, or the like, but is not limited thereto.

Meanwhile, the electronic apparatus (not shown) may improve the booting speed of the electronic device (not shown) using the auxiliary memory device 10 including a plurality of areas in which a method of storing data is different from one another, which will be described in greater detail below with reference to the accompanying drawings.

Figure 2:
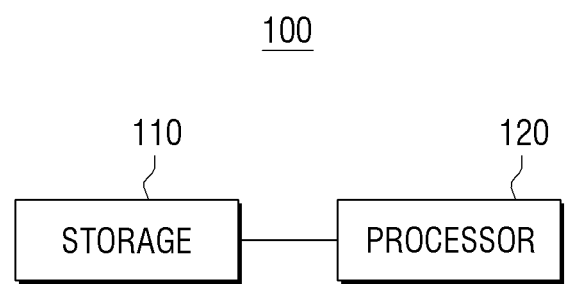
FIG. 2 is a block diagram illustrating an example configuration of an electronic apparatus according to an example embodiment.

FIG. 2 is a block diagram illustrating an example configuration of the electronic apparatus 100 according to an example embodiment.

Referring to FIG. 2, the electronic device 100 includes a storage 110 and a processor 120.

The storage 110 stores various data in, for example, a memory.

Main example of the storage 110 includes a flash memory. The flesh memory is a non-volatile memory which stores data in each cell consisting of a floating gate transistor. The cell of the flash memory may record or delete data by filling or emptying the floating gate using an electron. The flash memory may be divided into memory in the form of NOR, NAND, DINOR, and AND.

Hereinafter, embedded MultiMediaCard (eMMC) will be described as an example of the storage 110. However, various types of other storages such as a hybrid flash memory including both Single Level Cell (SLC) and Multi Level Cell (MLC) types simultaneously may also be used as the storage 110 according to an example embodiment. In addition, the storage 110 according to an example embodiment may be implemented using various storages which will be developed in the future along with the development of technology and is not limited to the examples described herein. The SLC and MLC will be described in greater detail below with reference to FIG. 4.

The MultiMediaCard (MMC) is a memory card standard of a flash card. The eMMC is a standard of a built-in MMC which is set as a standard by JEDEC. Specifically, the eMMC communication is based on 11 signal buses. The eMMC may be inserted and used in a mobile communication device such as a smart phone, The eMMC will be described in detail with reference to FIGS. 3 and 4, FIG. 3 is a block diagram illustrating an example eMMC system 110-1 according to an example embodiment.

Figure 3:
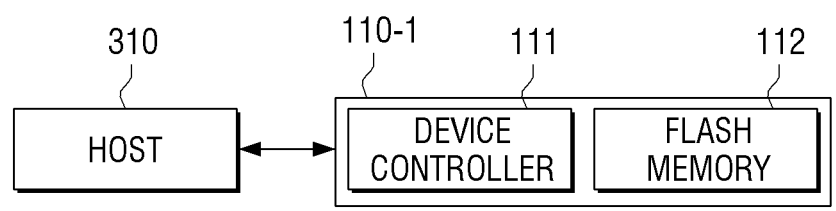
FIG. 3 is a diagram illustrating an example structure of an eMMC system according to an example embodiment.
Figure 4:
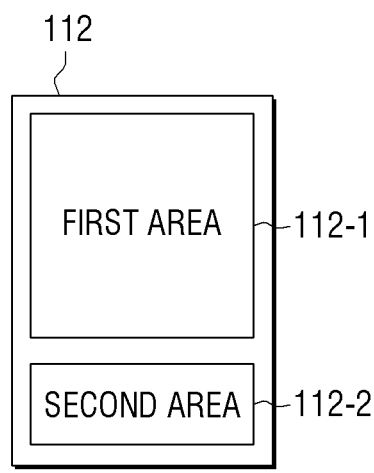
FIG. 4 is a block diagram illustrating an example configuration of a flash memory according to an example embodiment.

Referring to FIG. 3, the eMMC 110-1 includes a system host 310, a device controller 111 and a flash memory 112.

The host 310 may control the data processing operation of the eMMC 110-1 such as a data-reading operation, a data-writing operation, etc. Here, the data processing operation may be performed in single data rate (SDR) or double data rate (DDR).

The host 310 may refer to a data processing device which is capable of processing data such as central processing unit (CPU), processor, microprocessor, application processor, etc., and the data processing device may be embedded or implemented in the electronic apparatus 100.

In this case, the eMMC 110-1 and the host 310 may be electrically connected to each other through connection means (for example, pads, pins, bus or communication lines) for data communication.

The device controller 111 controls data communication between the host 310 and the memory 112.

Specifically, the device controller 111 receives a clock signal (CLK) and a command (CMD) from the host 310, analyzes the received command (CMD), generates a response (RES) according to the analysis result, and transmits the generated response (RES) and data generated based on the generated response (RES) to the host 310.

The device controller 111 includes firmware. The device controller 111 may operate FTL (Flash Translation Layer), Wear-leveling, and BBM (Bad Block Management), and divide NAND Array into a channel and wa ay to bring out better performance than pure NAND.

The flash memory 112 stores data. In particular, the flash memory 112 (here, the flash memory 112 is part of the eMMC 110-1) may be divided into a first area 112-1 and a second area 112-2 which has a different storage method for data from the first area 112-1. Specifically, the first area 112-1 has more bits which are stored in each cell than the second area 112-2, which will be described in detail with reference to FIG. 4.

FIG. 4 is a block diagram illustrating an example configuration of the flash memory 112 according to an example embodiment.

Referring to FIG. 4, the flash memory 112 may be divided into the first area 112-1 and the second area 112-2. For example, the first area 112-1 may be provided in the type of MLC, and the second area 112-2 may be provided in the type of SLC.

Specifically, the NAND type of the flash memory 112 is set to the MLC type. However, the flash memory 12 may change the MLC type in part or as a whole to the SLC type based on a block unit. For example, one MLC block may be replaced with one SLC block. The block refers to a unit where data is stored in a physical storage in the flash memory 112.

Here, the SLC stands for Single Level Cell, and may represent 1 bit per cell. The MLC stands for Multi Level Cell, and may represent 2 bits per cell. Generally, if the MLC type is changed to the SLC type, the SLC type may have as much as two times of read/write speed and as much as ten times of stability in comparison with the MLC type.

Meanwhile, in order to secure maximum and/or increased MLC capacity which may store more data than SLC, the amount of MLC of the second area 112-2 to be changed to SLC may be a minimum and/or reduced storage area for storing booting data stored in the first area 112-1.

Meanwhile, the partition which divides the flash memory 112 into an area of the SLC type 112-1 and an area of the MLC type 112-2 may be set when eMMC is manufactured, when the electronic apparatus 100 is manufactured, or the electronic apparatus 100 is operated.

Meanwhile, the processor 120 controls overall operations of the electronic apparatus 100.

When a predetermined event occurs, the processor 120 may store booting data stored in the first area 112-1 in the second area 112-2. Here, the predetermined event may be the event of turning on the electronic apparatus 100.

Specifically, when a predetermined event occurs, the processor 120 may store booting data stored randomly in a plurality of blocks constituting the first area 112-1 in a plurality of blocks constituting the second area 112-2 sequentially, which will be described in detail with reference to FIG. 5.

Figure 5:
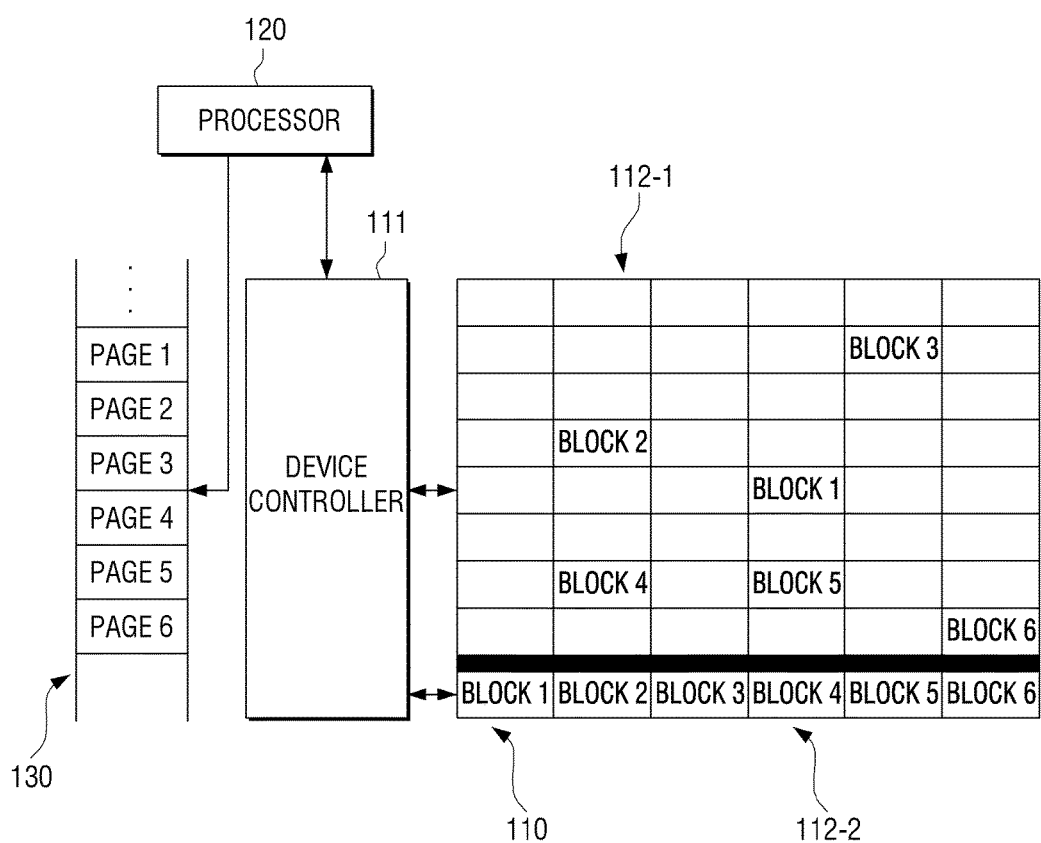
FIG. 5 is a block diagram illustrating an example operation of a processor according to an example embodiment.

FIG. 5 is a block diagram illustrating an example operation of the processor 120 according to an example embodiment.

Referring to FIG. 5, when a predetermined event (for example, a booting input) occurs, the processor 120 reads out booting data (blocks 1 to 6) stored in the first area 112-1 using the device controller 111. In this case, the processor 120 stores the read-out booting data in the blocks of the second area 112-2 sequentially.

Along with the above operation, the processor 120 stores the read-out booting data stored in the first area 112-1 in the pages (pages 1 to 6) of the RAM 130. Here, the pages refer to booting data stored in blocks which is decompressed, and are a bundle unit of the files processed by the RAM 130. The files corresponding to a plurality of pages may be stored in blocks in a compressed form, but in this example embodiment, it is assumed that the files stored in pages 1 to 6 and blocks 1 to 6 are matched one-on-one basis in order.

In addition, if a predetermined event occurs again while booting data is stored in the second area 112-2, the processor 120 may boot the electronic apparatus 100 using the booting data stored in the second area 112-2.

Specifically, the processor 120 may generate metadata (not shown) for mapping each of a plurality of blocks where booting data is stored in the first area 112-1 with each of a plurality of blocks where booting data is stored in the second area 112-2, and boot the electronic apparatus 100 using the booting data stored in the second area 112-2 based on the metadata (not shown) when a predetermined event occurs again, which will be described with reference to FIG. 6.

Figure 6:
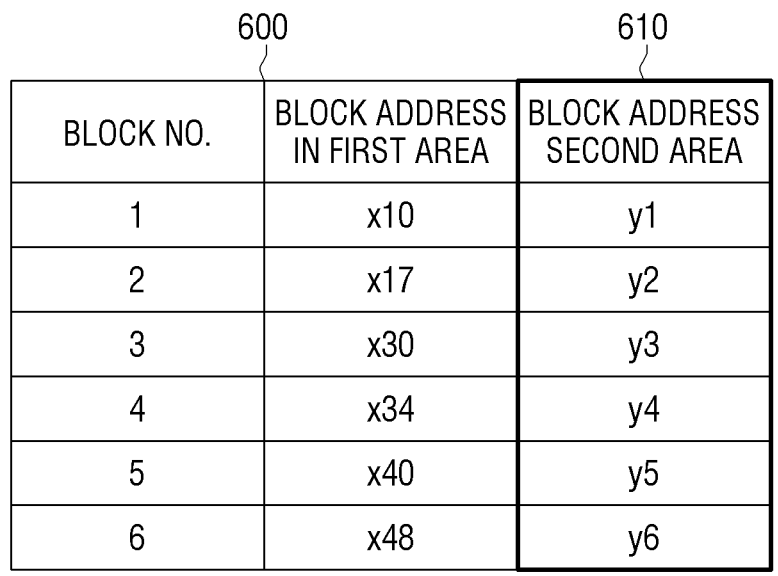
FIG. 6 is a table illustrating example metadata generated by a processor according to an example embodiment.

FIG. 6 is a table illustrating example metadata generated by a processor according to an example embodiment.

Referring to FIG. 6, the processor 120 may generate the metadata 600 which matches a block of the first area 112-1 where booting data is stored and a block of the second area 112-2 where booting data is stored. Here, for convenience of explanation, the metadata 600 is represented in the form of table 600.

For example, if an event occurs and booting is performed, the processor 120 may generate a portion of reference numeral 610 in FIG. 6.

Specifically, if block 1 of the first area 112-1 is stored in the second area 112-2, the processor 120 matches and stores the address (x10) of the corresponding block of the first area 112-1 where the block 1 is stored and the address (y1) of the corresponding block of the second area 112-2 where block 1 is stored. The processor 120 repeats the above process with respect to blocks 2 to 6 and store the addresses.

Subsequently, if a predetermined event occurs again, the processor 120, with reference to the metadata 600, advances a booting process by reading the blocks 1 to 6 from the second area 112-2 and load the same onto the pages 1 to 6 through the process of searching block 1 from block address y1 of the second area 112-2 and storing block 1 in page 1 of RAM 130, etc.

Once the booting process is completed, the processor 120 may operate the electronic apparatus 100 using data stored in the first area 112-1 after the booting of the electronic apparatus 100 is completed based on the booting data stored in the second area 112-2.

Meanwhile, the predetermined event may be a turn-on operation, and the processor 120 may confirm whether the turn-on operation is the first operation, the second operation or more. Here, a script refers to a series of programs or commands which are translated or performed by a main application. In addition, the processor 120 may determine the start point and the end point for storing a block stored in the first area 112-1 in the second area 112-2 and the start point and the end point for referring to the generated metadata 600 based on an I/O control command.

Figure 7:
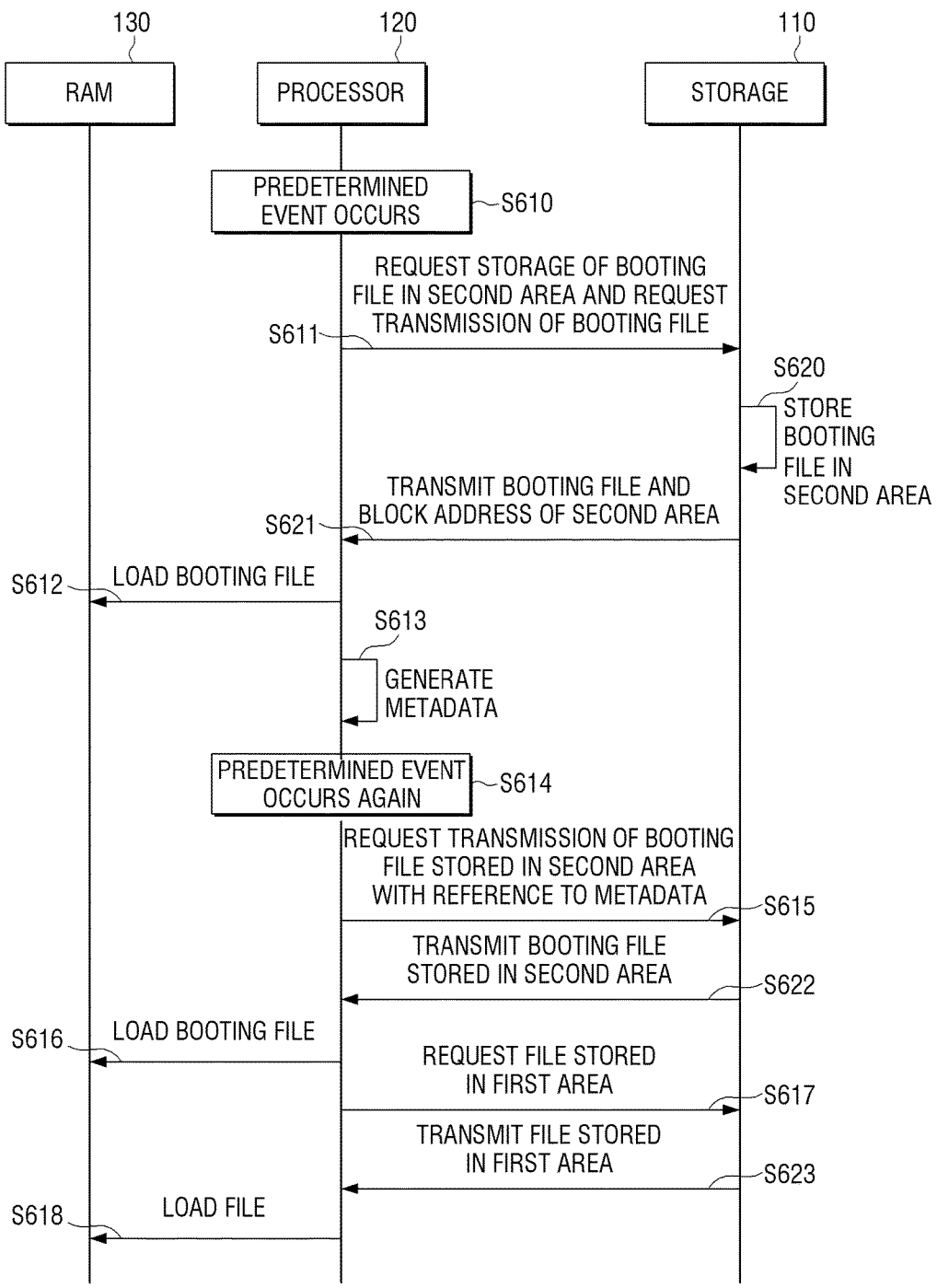
FIG. 7 is a flowchart illustrating an example operation of a storage, a processor and a RAM according to an example embodiment.

FIG. 7 is a flowchart illustrating an example operation of the storage 110, the processor 120 and the RAM 130 according to an example embodiment.

First of all, when a predetermined event occurs (S610), the processor 120 transmits a request for moving and storing the booting data stored in the first area 112-1 in the second area 112-2 and a request for transmitting the corresponding booting data to the storage 110 (S611). The storage 110 which receives the requests moves the booting data stored in the first area 112-1 in the second area 112-2 (S620). In addition, the storage 110 transmits the corresponding booting data and an address corresponding to the block of the second area 112-2 where the corresponding booting is stored to the processor 120 (S621). Meanwhile, the processor 120 which receives the booting data loads the booting data onto the RAM 130 (S612). In addition, the processor 120 generates the metadata 600 mapping an address corresponding to the block of the second area 112-2 where the transmitted booting data is stored and an address corresponding to the block of the first area 112-1 where the booting data is stored (S613).

When a predetermined event occurs again (S614), the processor 120 requests for transmission of the booting data stored in the second area 112-2 with reference to the generated metadata 600 (S615). In response to the request, the storage 110 transmits the booting data stored in the first area 112-1 to the processor 120 (S622). The processor 120 completes booting through the process of uploading the transmitted booting data onto the RAM 130 (S616).

Meanwhile, the processor 120 which completes the booting processor requests for a file stored in the first area 112-1 upon a request from various applications (S617). When a file is transmitted (S623), the processor 120 loads the corresponding file onto the RAM 130 (S618).

As such, when booting is performed using the booting data stored in the second area (for example, SLC), the booting can be performed at a faster booting speed than when booting is performed using the booting data stored in the first area (for example, MLC).

In addition, as the booting data is stored in successive blocks of the second area, the booting data can be loaded sequentially, thereby improving the booting speed significantly.

Figure 8:
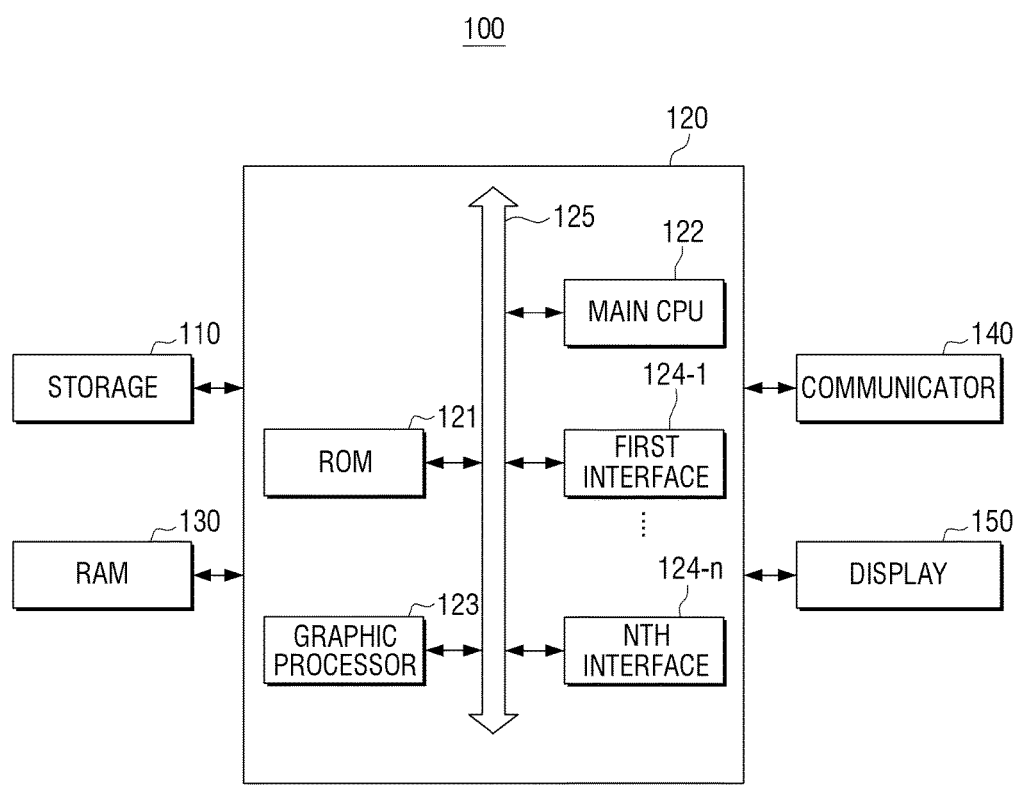
FIG. 8 is a block diagram illustrating an example configuration of an electronic apparatus according to an example embodiment.

FIG. 8 is a block diagram illustrating an example configuration of the electronic apparatus 100 according to an example embodiment.

Referring to FIG. 8, the electronic apparatus 100 includes the storage 110, the processor 120, a RAM 130, a communicator (e.g., including communication circuitry) 140 and a display 150. The elements of FIG. 8 which are overlapped with those described above will not be explained in detail.

The storage 110 may store various data such as Operating System (O/S) to operate the electronic apparatus 100, software module, various multimedia contents, etc.

In particular, the storage 110 may store booting data in the first area 112-1 and move and store the booting data in the second area 112-2 according to a command from the processor 120. In addition, the storage 110 may transmit the corresponding booting data to the processor 120 according to a command from the processor 120.

Meanwhile, in FIG. 8, it is assumed that the RAM 130 is provided outside the processor 120 to explain relations between elements conveniently, but the RAM 130 may also be provided inside the processor 120. Here, the RAM 130 will be described along with the processor 120.

The operation of the processor 120 may be performed by the program stored in the storage 110.

Specifically, the processor 20 may include a RAM 130, a ROM 121, a main CPU 122, a graphic processor 123, and first to nth interfaces 124-1 to 124-n, and bus 125.

In this example, the RAM 130, the ROM 121, the main CPU 122, the graphic processor 123, and first to nth interfaces 124-1 to 124-n may be connected to one another or communicate with one another via bus 125.

The first to nth interfaces 124-1 to 124-n are connected to the aforementioned various features. One of the interfaces may be a network interface connected to an external apparatus via network.

The ROM 121 stores a set of commands for booting a system. When a command to turn on power is input and power is supplied, the main CPU 122 copies an operating system (O/S) stored on the storage 110 according to a command word stored on the ROM 121, and executes the O/S to boot the system. When the booting is complete, the main CPU 122 copies various application programs stored on the storage 110, and executes the application programs copied onto the RAM 130 and performs various operations.

The main CPU 122 may access the storage 110, and perform booting by using the operating system (OS) stored in the storage 110. Then, the main CPU 122 performs various operations using various programs, contents, data, etc. stored on the storage 110.

The graphic processor 123 generates a screen including various objects, such as an icon, an image, a text, and the like, using a computation unit (not shown) and a rendering unit (not shown). The computation unit computes an attribute value, such as a coordinate value where each object is displayed, a form, a size, a color, and the like, according to a screen layout using a control command received from the input unit 260. The rendering unit and the computation unit generate screens of various layouts including an object based on the computed attribute value.

The communicator 140 may utilize various communication circuitry to perform communications with an external apparatus. Here, the communicator 140 may perform communication with an external apparatus through various communication methods and communication circuitry, such as, for example, and without limitation, BT (BlueTooth), WI-FI (Wireless Fidelity), Zigbee, IR (Infrared), Serial Interface, USB (Universal Serial Bus), NFC (Near Field Communication), etc.

The display 150 outputs various images. For example, the display 150 may display various screens generated by the graphic processor 123.

To do so, the display 150 may be implemented as Liquid Crystal Display (LCD), Organic Light Emitting Display (OLED), etc.

Meanwhile, the display 150 may further include addition elements depending on embodiment methods. For example, if the display 150 is an LCD, the display 150 may include an LCD display panel, a backlight unit which provides light to the LCD display panel, a panel driving substrate, etc.

In addition, the electronic apparatus 100 may further include au audio processor (not shown) which processes audio data, a video processor (not shown) which processes video data, a speaker (not shown) which outputs not only various audio data processed by the audio processor (not shown) but also various notification sounds, voice messages, etc., a microphone (not shown) which receives a user voice or other sounds and convert the same to audio data, etc.

Figure 9:
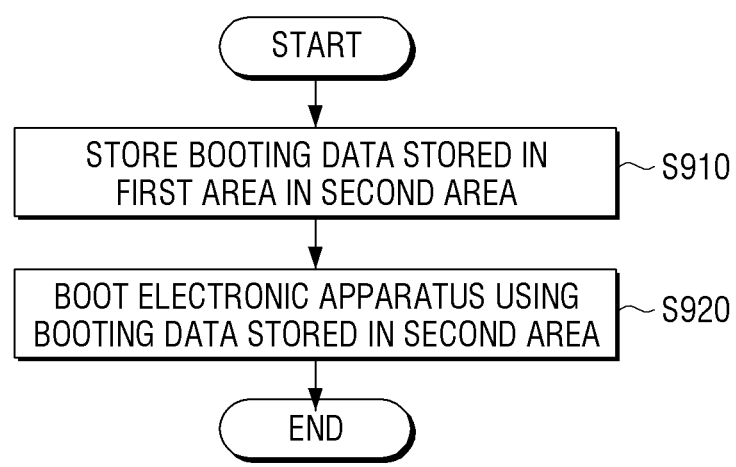
FIG. 9 is a flowchart illustrating an example booting method of an electronic apparatus according to an example embodiment.

FIG. 9 is a flowchart illustrating an example booting method of the electronic apparatus 100 according to an example embodiment.

First of all, as for the booting method, when a predetermined event occurs, the booting data stored in the first area 112-1 is stored in the second area 112-2 (S910), and if the predetermined event occurs again while the booting data is stored in the second area 112-2, the electronic apparatus 100 is boot using the booting data stored in the second area 112-2 (S910). In this case, the electronic apparatus 100 includes the storage 110 which is divided into the first area 112-1 and the second area 112-2 with a different storage method for data from the first area 112-1.

Here, the first area 112-1 may have more bits which are stored in each cell than the second area 112-2.

In addition, the first area 112-1 may be a MLC type, and the second area 112-2 may be an SLC type.

Here, the booting method may further include, when a predetermined event occurs, the booting data which is stored randomly in a plurality of blocks constituting the first area 112-1 in a plurality of blocks constituting the second area 112-2 sequentially.

In addition, the booting method further include generating metadata for mapping for mapping each of a plurality of blocks where booting data is stored in the first area 112-1 with each of a plurality of blocks where the booting data is stored in the second area 112-2, and if the predetermined event occurs again, booting the electronic apparatus 100 using the booting data stored in the second area 112-2 (S920) based on the metadata.

In addition, the second area 112-2 may have a minimum and/or reduced storage area for storing the booting data stored in the first area 112-1.

In addition, the booting method may further include operating the electronic apparatus 100 using the data stored in the first area 112-1 after the booting of the electronic apparatus 100 is completed based on the booting data stored in the second area 112-2.

The predetermined event may be a turn-on operation of the electronic apparatus 100.

Meanwhile, the setting method of the electronic apparatus 100 according to various example embodiments may be implemented as a program code which is executed by a computer and provided in each server or devices so that the method can be executed by the processor 120 while being stored in various non-transitory computer readable media.

For example, a non-transitory computer readable medium which stores a program which performs the steps of, if a predetermined event occurs, storing the booting data stored in the first area 112-1 in the second area 112-2 (S910), and if the predetermined event occurs again while the booting data is stored in the second area 112-2, booting the electronic apparatus 100 using the booting data stored in the second area 112-2 (S920) may be provided.

The non-transitory computer readable medium refers to a medium that is readable by an apparatus. Specifically, the above-described various applications or programs may be stored in the non-transitory computer readable medium such as a compact disc (CD), a digital versatile disc (DVD), a hard disk, a Blu-ray disk, a universal serial bus (USB), a memory card, a ROM or etc.

While the present disclosure has been illustrated and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic apparatus comprising:
a storage comprising a first area and a second area, a data storage method of the second area being different from a data storage method of the first area; and
a processor configured to, in response to the electronic apparatus being turned on, obtain booting data from a plurality of data stored in the first area, store the booting data in the second area, and, in response to the electronic apparatus being turned on again while the booting data is stored in the second area, boot the electronic apparatus using the booting data stored in the second area and operate the electronic apparatus using the plurality of data, other than the booting data, stored in the first area after booting of the electronic apparatus is completed.

2. The apparatus as claimed in claim 1, wherein the storage comprises memory cells and the first area has a higher number of bits stored per cell than the second area.

3. The apparatus as claimed in claim 1, wherein the first area is provided as a Multi Level Cell (MLC) type and the second area is provided as a Single Level Cell (SLC) type.

4. The apparatus as claimed in claim 1, wherein the processor, in response to the electronic apparatus being turned on, is configured to store the booting data stored randomly in a plurality of blocks in the first area, sequentially in a plurality of blocks of the second area.

5. The apparatus as claimed in claim 4, wherein the processor is configured to generate metadata for mapping each of a plurality of blocks where the booting data is stored in the first area with each of a plurality of blocks where the booting data is stored in the second area, and in response to the electronic apparatus being turned on again, to boot the electronic apparatus using the booting data stored in the second area using the metadata.

6. The apparatus as claimed in claim 1, wherein a storage area of the second area for storing the booting data has less storage capacity than a storage area for storing the booting data stored in the first area.

7. A method of booting an electronic apparatus, the electronic apparatus including a storage comprising a first area and a second area, the second area having a data different storage method of the second area being different from a data storage method of the first area, the method comprising:
in response to the electronic apparatus being turned on, obtaining booting data from a plurality of data stored in the first area;
storing the booting data in the second area; and
in response to the electronic apparatus being turned on again while the booting data is stored in the second area, booting the electronic apparatus using the booting data stored in the second area and operating the electronic apparatus using the plurality of data, other than the booting data, stored in the first area after booting of the electronic apparatus is completed.

8. The method as claimed in claim 7, wherein the storage comprises memory cells and the first area has a higher number of bits stored per cell than the second area.

9. The method as claimed in claim 7, wherein the first area is provided as a Multi Level Cell (MLC) type and the second area is provided as a Single Level Cell (SLC) type.

10. The method as claimed in claim 7, further comprising:
storing the booting data, stored randomly in a plurality of blocks in the first area sequentially in a plurality of blocks in the second area in response to the electronic apparatus being turned on.

11. The method as claimed in claim 7, further comprising:
generating metadata for mapping each of a plurality of blocks where the booting data is stored in the first area with each of a plurality of blocks where the booting data is stored in the second area; and booting the electronic apparatus using the booting data stored in the second area using the metadata in response to the electronic apparatus being turned on again.

12. The method as claimed in claim 7, wherein a storage area of the second area for storing the booting data has less storage capacity than a storage area of the first area for storing the booting data stored in the first area.

\* \* \* \* \*